(12) United States Patent
Mischler et al.

(10) Patent No.: US 8,141,856 B2
(45) Date of Patent: Mar. 27, 2012

(54) PALLET LOADER AND MANIPULATOR

(75) Inventors: Peter L. Mischler, Rockton, IL (US);
Noel D. Nichols, Pectaonica, IL (US);
Robert R. Hornby, Janesville, WI (US)

(73) Assignee: MAG IAS, LLC, Sterling Heights, MI (US)

( * ) Notice: Subject to any disclaimer, the term of this patent is extended or adjusted under 35 U.S.C. 154(b) by 1027 days.

(21) Appl. No.: 12/098,070

(22) Filed: Apr. 4, 2008

(65) Prior Publication Data

US 2009/0252587 A1 Oct. 8, 2009

(51) Int. Cl.
*B23Q 1/64* (2006.01)
(52) U.S. Cl. ........................................................ 269/56
(58) Field of Classification Search .................... 269/17, 269/55; 198/319, 750.14, 607, 369.6, 370.05, 198/468.6; 414/795.3, 758, 760, 773, 778
See application file for complete search history.

(56) References Cited

U.S. PATENT DOCUMENTS

| | | | |
|---|---|---|---|
| 3,610,160 A * | 10/1971 | Alimanestianu | 104/165 |
| 4,421,466 A | 12/1983 | Heitzman | |
| 5,209,629 A | 5/1993 | Rasmussen | |
| 5,630,696 A * | 5/1997 | Gordon | 414/782 |
| 6,626,631 B1 * | 9/2003 | Malakiman | 414/773 |
| 2005/0055815 A1 | 3/2005 | Giett et al. | |
| 2005/0143236 A1 | 6/2005 | Nakazawa et al. | |
| 2006/0236515 A1 * | 10/2006 | Kurt et al. | 29/33 P |

OTHER PUBLICATIONS

International Search Report, Nov. 18, 2009, PCT/US2009/039430.
Written Opinion of the International Searching Authority, Nov. 18, 2009.

* cited by examiner

*Primary Examiner* — Lee D Wilson
*Assistant Examiner* — Jamal Daniel
(74) *Attorney, Agent, or Firm* — Reising, Ethington P.C.

(57) ABSTRACT

A pallet load stand and manipulator allows a pallet to receive a workpiece and the workpiece to be clamped to the pallet while the pallet is in a horizontal position. Once the workpiece has been clamped to the pallet, the pallet may be rotated to a vertical position so that the pallet may be loaded onto a machine tool that operates on a workpiece with the pallet in the vertical position. The pallet may also be rotated to an intermediate position, similar to an artist's easel, in which the pallet is held in an inclined position, between the horizontal and vertical positions by positive locating assemblies and positive stops.

9 Claims, 3 Drawing Sheets

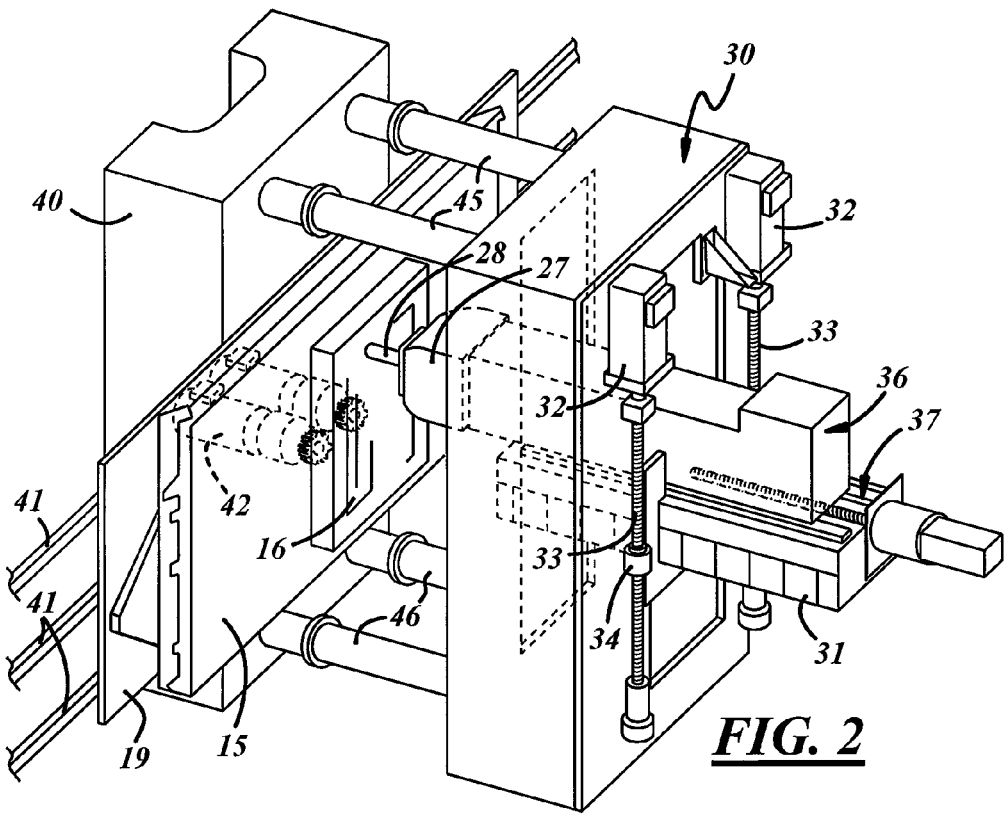
FIG. 2
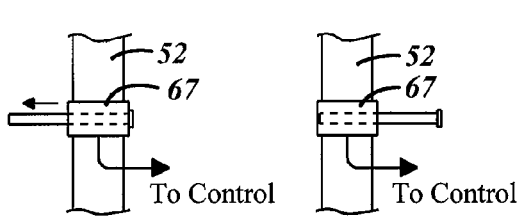
FIG. 3C    FIG. 3B
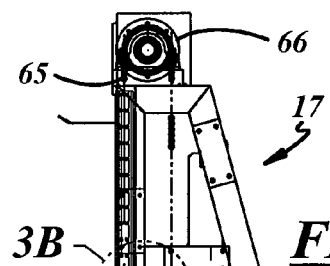
FIG. 3A
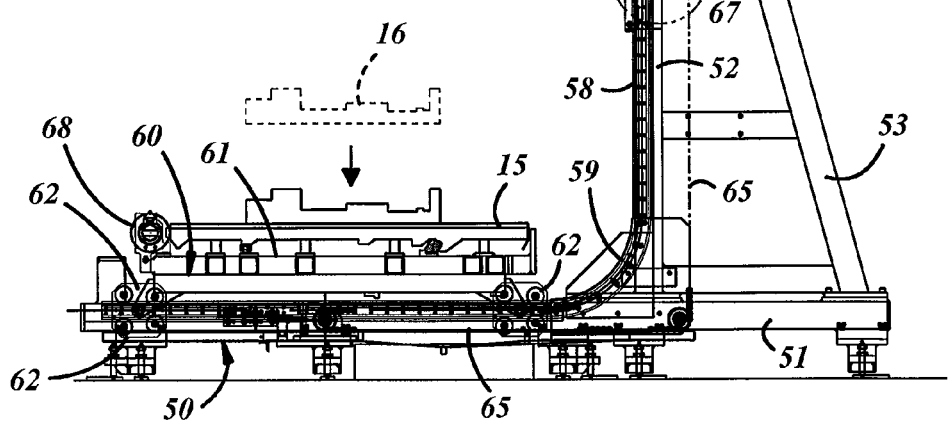

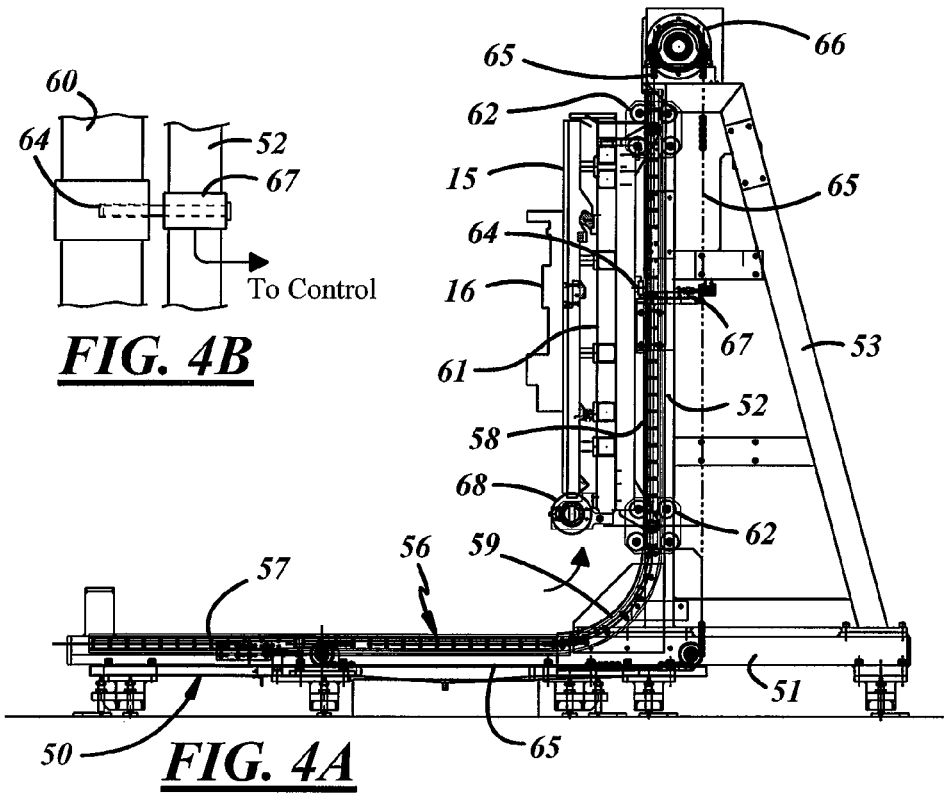
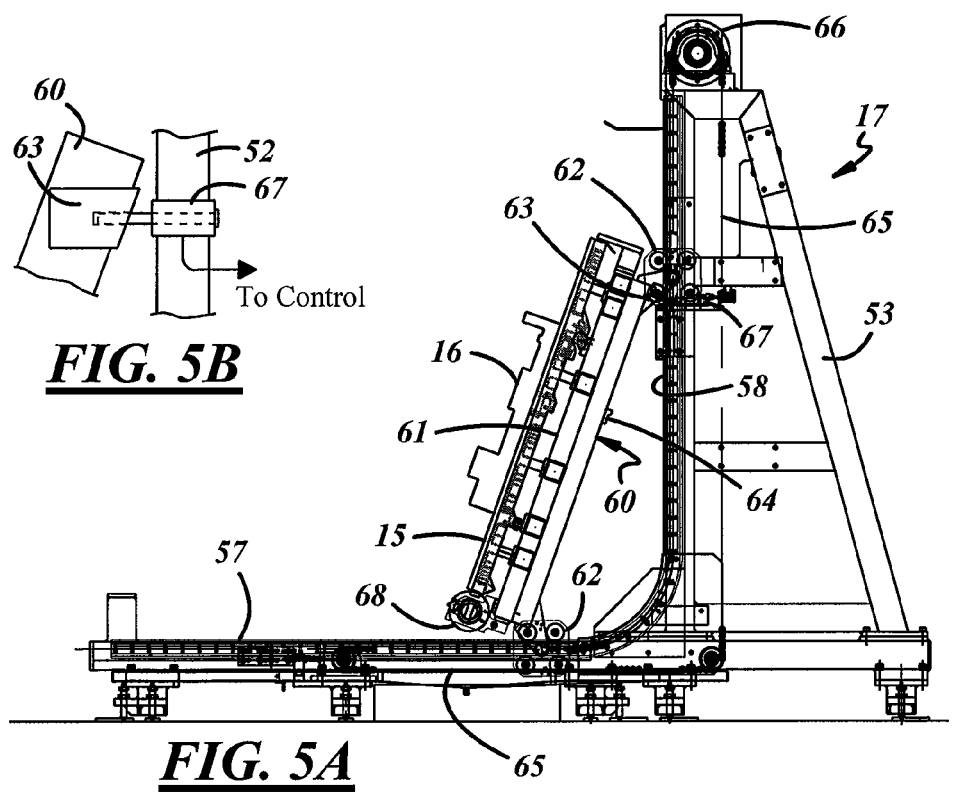

PALLET LOADER AND MANIPULATOR

FIELD OF THE INVENTION

The pallet loader and manipulator may be loaded with a pallet in a horizontal position and can be used to re-orient the pallet to the vertical position for loading the pallet and the workpiece into a machine tool.

BACKGROUND OF THE INVENTION

Certain machine tools such as plate mills operate on a workpiece with the pallet oriented in the vertical position. If the workpiece is large, mounting the workpiece on the pallet with the pallet in the vertical position can be a difficult task. The workpiece has to be supported against the force of gravity while it is being clamped to the pallet. Additionally, when the pallet is in a vertical position, it may be physically difficult to reach the top of the pallet in order to align the workpiece along the top edge of the pallet and to actuate the clamps along the top of the pallet to secure the workpiece to the pallet.

BRIEF DESCRIPTION OF THE SEVERAL VIEWS OF THE DRAWING

FIG. 2 is a simplified perspective view of the machine tool of FIG. 1.

FIG. 3A shows a pallet loader with the pallet in the horizontal loading position.

FIGS. 3B and 3C are detail views of portion 3B of FIG. 3A showing a shotpin in the retracted and extended positions, respectively.

FIG. 4A shows the pallet loader of FIG. 3 with the pallet in the vertical machine loading position.

FIG. 4B is a detail view of FIG. 4A showing a shotpin engaging a shotpin receiver on the pallet carriage.

FIG. 5A shows the pallet loader of FIG. 3 with the pallet in an intermediate inclined position.

FIG. 5B is a detail view of FIG. 5A showing a shotpin engaging a shotpin receiver on the pallet carriage.

BRIEF SUMMARY OF THE INVENTION

Figure 1:
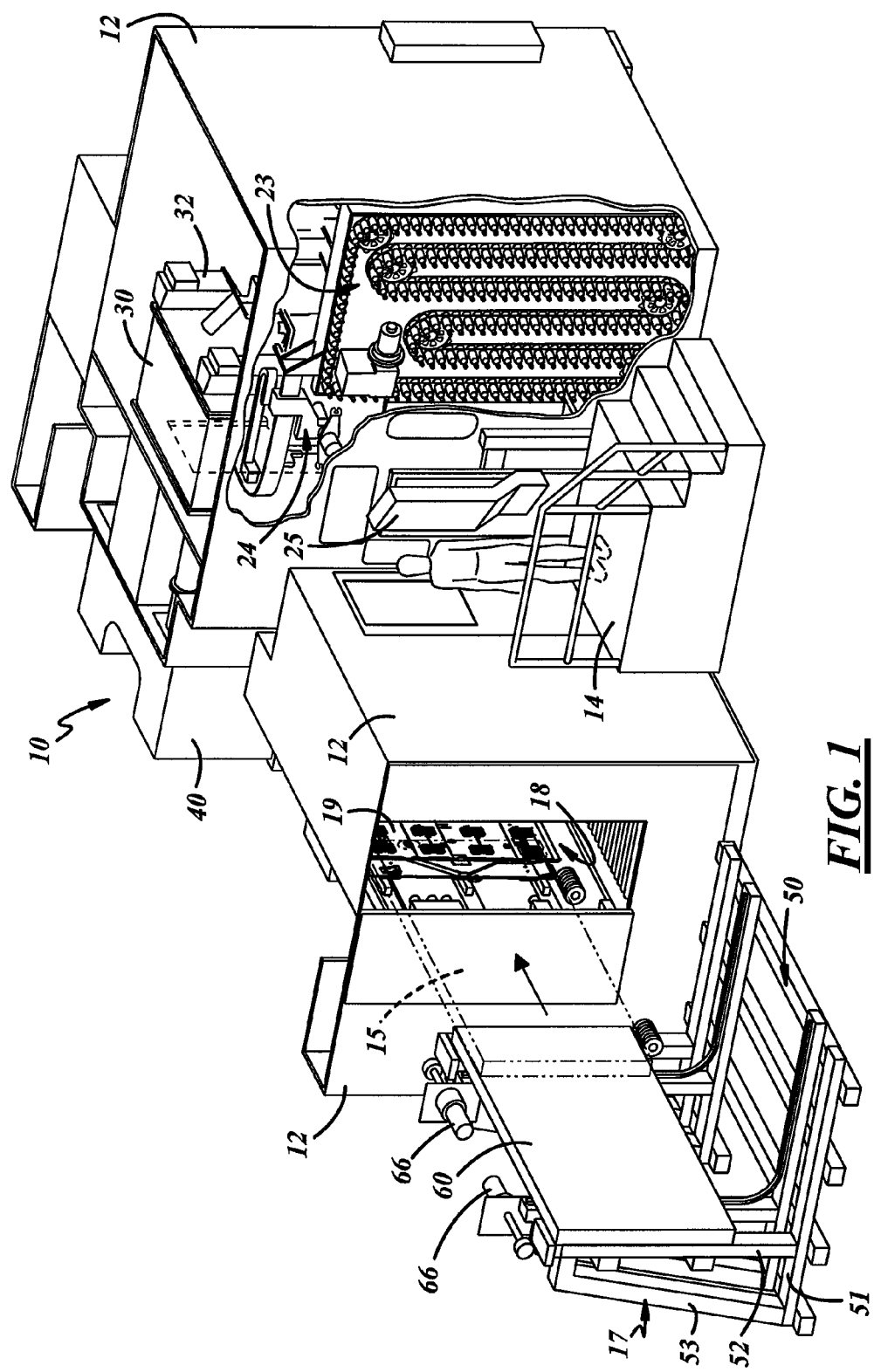
FIG. 1 is a perspective view of a machine tool with a pallet loader in position to load a pallet in the vertical position into the machine tool.

A pallet load stand and manipulator allows a pallet to receive a workpiece and the workpiece to be clamped to the pallet while the pallet is in a horizontal position. Once the workpiece has been clamped to the pallet, the pallet may be re-oriented to a vertical position so that the pallet may be loaded into a machine tool that operates on a workpiece with the pallet in the vertical position. The pallet may also be rotated to an intermediate position, similar to an artist's easel, in which the pallet is held in an inclined position, between the horizontal and vertical positions.

DETAILED DESCRIPTION OF THE INVENTION

FIG. 1 shows a machine tool generally designated by the reference numeral 10. The machine tool is surrounded by standard guarding 12, and an operator station 14 is positioned outside of the guarding. The machine tool receives a pallet 15 from a pallet manipulator 17 that may be positioned adjacent to a pallet access opening 18 in the guarding. The pallet 15 is transferred from the pallet manipulator 17 to a pallet receiver 19 that is a part of the machine. The pallet receiver 19 is then driven to the working zone of the machine in front of the spindle and the working tool The operator viewing station 14 is positioned to allow the operator to view the tool magazine 23 and the automatic tool changing mechanism 24 inside of the guarding from the operator station. The operator station includes a standard control panel 25 by means of which the operator can program and operate the machine 10.

FIG. 2 shows the X, Y, and Z-axis elements of the machine tool. A pallet 15 with a workpiece 16 is positioned in front of a spindle or multi-axis head 27 that carries the working tool 28 and this establishes a workzone. The Y-axis column 30 is fixed and is bifurcated. The Y-axis column 30 carries a vertically movable saddle 31 that is mounted on vertical linear guides or ways. A servomotor 32 is mounted on each side of the Y-axis column 30, and each servomotor 32 is coupled to a drive screw 33. The drive screws 33 engage drive nuts 34 on opposite sides of the saddle 31, and the servomotors 32 are used to raise and lower the saddle to the desired vertical position.

The vertically movable saddle 31 carries a Z-axis slide 36. A Z-axis drive assembly 37 comprises a servomotor 38 and a drive screw 39 that are mounted on the Z-axis saddle 31. The Z-axis drive assembly 37 may be selectively controlled to position the Z-axis slide 36 and the working tool 28 in the desired position along the Z-axis.

An X-axis frame member 40 supports a plurality of X-axis rails 41. The pallet receiver 19 is mounted on the X-axis rails 41 for horizontal movement along the X-axis. The pallet receiver carries a vertically mounted pallet 15 on which a workpiece 16 may be mounted. One or more X-axis drive motors 42 shown in phantom are mounted on the X-axis frame member 40 to drive the pallet receiver back and forth along the X-axis rails 41. The X-axis frame member 40 is coupled to the Y-axis column 30 by upper and lower tubular frame members 45 and 46 respectively.

FIGS. 3-5 show the pallet loader and manipulator 17. The pallet loader comprises a lower generally rectangular horizontal base portion 50 that includes two rear extending outrigger portions 51. A vertical support portion 52 is mounted on each base portion 50, and hypotenuse braces 53 connect the top of the vertical support portion 52 to the ends of the two rear extending outrigger portions 51.

Roller tracks 56 are mounted on either side of the pallet loader 17. The roller tracks in the preferred configuration include a horizontal portion 57, a vertical portion 58, and a radius portion 59 joining the bottom of the vertical portion 58 to the horizontal portion 57. A pallet carriage 60 comprising a pallet support plate 61 and rollers 62 rides on the roller tracks 56. The pallet support plate 61 is configured to receive and temporarily clamp a pallet 15 that is placed thereon. Standard clamping expedients such as mechanical, hydraulic, or electromechanical clamping devices may be used to clamp the pallet to the pallet support plate 61.

As shown on FIGS. 3B and 3C, a positive locating assembly such as a shotpin 67 is mounted on the vertical support portion 52 of the pallet manipulator 17. The shotpin 67 is configured to engage two or more shotpin receivers 63 and 64 on the pallet carriage 60, as more fully described below. The shotpin may comprise a pneumatically actuated pin or slide, but other mechanisms may be used.

The preferred configuration of the load stand utilizes a chain 65 driven by a motor 66 to move the pallet carriage 60 and a pallet 15 between the horizontal and vertical position, but other drives can be used. In the preferred configuration, a chain 65 is provided on each side of the pallet loader, and a motor 66 to drive the chains is mounted on the top of each vertical support portion 58. A pallet drive motor 68 may be provided on the bottom of the pallet carriage 60. The pallet drive motor 68 may be used to rotate a drive element such as a helical screw or other traction device that is used to drive the pallet 15 off of the pallet carriage and onto the pallet receiver of a machine tool. The helical screw may engage cam followers (not shown) that are mounted on the bottom of the pallet, although other drive arrangements for the pallet 15 may be provided.

The load stand 17 allows the pallet to be rotated from a horizontal position as shown in FIG. 3A for workpiece loading and clamping to a vertical position as shown in FIG. 4A for loading the pallet 15 with the workpiece 16 into the machine. The load stand itself may be mounted on casters or rails allowing it be loaded at a station remote from the machine and then moved into position adjacent the machine so that the pallet can be transferred from the load stand into the machine.

The load stand 17 may also be provided with a second stop position to position the pallet support plate and the pallet in an inclined position at an angle of between 10 and 20 degrees from the vertical as shown in FIG. 5A. This allows the advantage of access to the workpiece 16 that is provided by a vertical pallet 15 while allowing the weight of the workpiece to be supported by the horizontal portion 57 of the roller track similar to the support that is given to a canvas on an artist's easel.

The shotpin 67 or other positive locating assembly comprises a failsafe locking device that may be utilized to lock the pallet carriage 60 in either the inclined position or the vertical position to ensure the pallet does not drop in the event of drive loss from the chain drive motor 66. A first shotpin receiver 63 is mounted on the pallet carriage 60 to receive the shotpin 67 when the pallet carriage is in the inclined position as shown in FIGS. 5A and 5B. A second shotpin receiver 64 is mounted on the pallet carriage 60 to receive the shotpin 67 when the pallet carriage is in the vertical position as shown in FIGS. 4A and 4B. The engagement of the shotpin 67 with either of the shotpin receivers 63 and 64 as shown in FIGS. 4B and 5B will positively locate the pallet carriage 60 in either the vertical or inclined positions on the pallet loader 17, and will prevent movement of the pallet carriage until the shotpin is withdrawn from the shotpin receiver. Thus, the shotpin receivers 63 and 63 comprise positive locating assemblies and positive stops for the pallet carriage 60.

Having thus described the invention, various alterations and modifications may be apparent to those skilled in the art, which modifications and alterations are to be considered to be within the scope of the invention as defined by the appended claims.

We claim:

1. A pallet loader and manipulator for loading a pallet and a workpiece into a machine tool, the pallet loader and manipulator comprising:
   a generally rectangular base;
   a plurality of vertical support portions mounted on the base;
   roller tracks mounted on either side of the pallet loader and manipulator;
   a pallet carriage guided by the roller tracks;
   a pallet support plate mounted on the pallet carriage; the pallet support plate configured to receive a pallet and a workpiece; whereby the pallet and the workpiece may be loaded onto the pallet support plate with the pallet carriage and the pallet support plate in the horizontal position, and whereby the pallet carriage, the pallet support plate, the pallet and the workpiece may be re-oriented to the vertical position to load the pallet and the workpiece into the machine tool in the vertical position; and
   a pallet drive motor coupled to the pallet carriage, whereby the pallet drive motor may be used to drive the pallet off of the pallet carriage and onto the machine tool.

2. The pallet loader and manipulator of claim 1 further comprising:
   a chain drive for re-orienting the pallet carriage between horizontal and vertical positions; and,
   a motor for driving the chain.

3. The pallet loader of claim 1 further comprising:
   rollers for mounting the pallet carriage to the roller tracks; and
   the roller tracks comprising a vertical portion, a horizontal portion, and a radius portion joining the bottom of the vertical portion to the horizontal portion.

4. The pallet loader of claim 1 further comprising:
   a stop position to position the pallet support plate in an inclined position between the horizontal and the vertical position.

5. The pallet loader of claim 4 wherein the inclined position for the pallet carriage and the pallet support plate is at an angle of between 10 and 20 degrees from the vertical.

6. The pallet loader of claim 5 further comprising:
   a locking device to lock the pallet carriage in either the inclined position or the vertical position.

7. The pallet loader of claim 6 further comprising:
   a shotpin comprising the locking device.

8. The pallet loader of claim 1 further comprising:
   two rear extending outrigger portions comprising part of the rectangular base; and,
   hypotenuse braces connecting the top of the vertical support portion to the ends of the two rear extending outrigger portions.

9. A pallet loader and manipulator for loading a pallet and a workpiece into a machine tool, the pallet loader and manipulator comprising:
   a generally rectangular base;
   a plurality of vertical support portions mounted on the base;
   roller tracks mounted on either side of the pallet loader and manipulator;
   the roller tracks comprising a vertical portion, a horizontal portion, and a radius portion joining the bottom of the vertical portion to the horizontal portion;
   a pallet carriage guided by the roller tracks;
   rollers for mounting the pallet carriage to the roller tracks;
   a pallet support plate mounted on the pallet carriage; the pallet support plate configured to receive a pallet and a workpiece; whereby the pallet and the workpiece may be loaded onto the pallet support plate with the pallet carriage and the pallet support plate in the horizontal position, and whereby the pallet carriage, the pallet support plate, the pallet and the workpiece may be re-oriented to the vertical position to load the pallet and the workpiece into the machine tool in the vertical position; and,
   a device for transferring the pallet from the pallet loader and manipulator into the machine tool for a machining operation.

* * * * *